US 8,402,021 B2

(12) United States Patent
Nad et al.

(10) Patent No.: US 8,402,021 B2
(45) Date of Patent: Mar. 19, 2013

(54) PROVIDING POSTS TO DISCUSSION THREADS IN RESPONSE TO A SEARCH QUERY

(75) Inventors: Tomislav Nad, Mountain View, CA (US); Jonathan Wilson, Cupertino, CA (US)

(73) Assignee: Google Inc., Mountain View, CA (US)

( * ) Notice: Subject to any disclaimer, the term of this patent is extended or adjusted under 35 U.S.C. 154(b) by 368 days.

(21) Appl. No.: 12/533,959

(22) Filed: Jul. 31, 2009

(65) Prior Publication Data

US 2010/0030753 A1    Feb. 4, 2010

Related U.S. Application Data

(60) Provisional application No. 61/085,783, filed on Aug. 1, 2008.

(51) Int. Cl.
*G06F 17/30* (2006.01)
(52) U.S. Cl. .................................................. 707/726
(58) Field of Classification Search .................. 707/726
See application file for complete search history.

(56) References Cited

U.S. PATENT DOCUMENTS

| | | | |
|---|---|---|---|
| 6,691,104 B1 | 2/2004 | Kraft et al. | |
| 7,373,606 B2 * | 5/2008 | Gorzela | 715/738 |
| 7,949,643 B2 * | 5/2011 | Kawale et al. | 707/706 |
| 8,099,408 B2 * | 1/2012 | Zhang et al. | 707/709 |
| 8,229,910 B2 * | 7/2012 | Jania et al. | 707/706 |
| 2006/0101003 A1 | 5/2006 | Carson et al. | |
| 2006/0161542 A1 | 7/2006 | Cucerzan et al. | |
| 2006/0287989 A1 * | 12/2006 | Glance | 707/3 |
| 2007/0208703 A1 | 9/2007 | Shi et al. | |
| 2008/0005234 A1 | 1/2008 | Newnam et al. | |
| 2008/0208975 A1 * | 8/2008 | Olive | 709/205 |
| 2009/0319518 A1 * | 12/2009 | Koudas et al. | 707/5 |
| 2010/0299326 A1 * | 11/2010 | Germaise | 707/728 |

OTHER PUBLICATIONS

Laurie P. Dringus & Timothy Ellis, "Using Data Mining as a Strategy for Assessing Asynchronous Discussion Forums", 45 Computers & Education (2005), pp. 141-160.*
Hanny Yulius Limanto et al., "An Information Extraction Engine for Web Discussion Forums", ACM's WWW 2005, May 10-14, 2005, pp. 978-979.*
Andrew Turpin et al., "Fast Generation of Result Snippets in Web Search", ACM's SIGIR 2007, Jul. 23-27, 2007, pp. 127-134.*
Yida Wang et al., "Exploring Traversal Strategy for Web Forum Crawling", ACM's SIGIR 2008, Jul. 20-24, 2008, pp. 459-466.*
International Application No. PCT/US20091052344, Notification of Transmittal of the International Search Report and the Written Opinion of the International Searching Authority, Feb. 25, 2010.

* cited by examiner

*Primary Examiner* — Wilson Lee
*Assistant Examiner* — Scott A Waldron
(74) *Attorney, Agent, or Firm* — Fish & Richardson P.C.

(57) ABSTRACT

Systems, methods and apparatus, including computer program products, to provide posts to discussion threads in response to a search query. The methods include receiving information identifying multiple resources that have been identified by a search engine as satisfying a search query, identifying a first resource in the multiple resources as including a post to a discussion forum, and identifying one or more second resources that are each distinct from the first resource. Each second resource is linked directly or indirectly to the first resource and includes one or more other posts to the discussion forum. Further, the method includes extracting information from the first resource and the one or more second resources about the discussion forum, and providing the extracted information together with a link to the first resource to a user device for display to a user as part of a response to the search query.

27 Claims, 5 Drawing Sheets

PROVIDING POSTS TO DISCUSSION THREADS IN RESPONSE TO A SEARCH QUERY

CROSS-REFERENCE TO RELATED APPLICATIONS

This application claims priority to U.S. Application Ser. No. 61/085,783, filed on Aug. 1, 2008, and entitled "Providing posts to discussion threads in response to a search query," the entire contents of which are incorporated herein by reference.

TECHNICAL FIELD

This specification relates to Internet search engines presenting search results including posts to discussion forums.

BACKGROUND

A variety of information can be made available to users on a network, such as the Internet. In response to receiving search queries, search engines effectively search multiple content hosts hosting multiple resources to identify resources that satisfy the received queries. Generally, search engines present search results as a list of links where each link enables a user to access one of the identified resources. An identified resource can have one or more additional embedded resources. Generally, search engines provide snippets of information adjacent to a link. The snippets include portions of the identified resource, e.g., text, that are identical or similar to the text included in the search query. The resources stored at the content hosts and identified by search engines can include web pages that include posts to discussion threads.

SUMMARY

This specification describes systems and methods that provide posts to discussion threads in response to a search query. In one example, in response to receiving a search query, a search engine identifies information including multiple resources as search results that satisfy the search query. Using the techniques described here, resources, in the search results, that are discussion thread web pages including posts to discussion forums, and information about the discussion forums are identified. Also, information related to the discussion threads is provided for display in a display device. In some cases, this information is provided along with information showing other kinds of search results.

In general, one aspect of the subject matter described in this specification can be embodied in methods that include the actions of receiving information identifying a plurality of resources that have been identified by a search engine as satisfying a search query; identifying a first resource in the plurality of resources as including a post to a discussion forum; identifying one or more second resources that are each distinct from the first resource, each second resource being linked directly or indirectly to the first resource, each second resource including one or more other posts to the discussion forum; extracting information from the first resource and the one or more second resources about the discussion forum; and providing the extracted information together with a link to the first resource to a user device for display to a user as part of a response to the search query. Other embodiments of this aspect include corresponding systems, apparatus, and computer program products configured to perform the operations of the methods.

These and other embodiments can each optionally include one or more of the following features. The one or more second resources are identified based at least in part on one or more attributes that the first resource and each second resource share, and the operations to identify the one or more second resources further include determining a value of an attribute for the first resource; identifying other resources with which the attribute is associated; determining the value of the attribute of the other resources; and designating an identified resource as a second resource if the value of the attribute of the identified resource equals the value of the attribute of the first resource. The one or more attributes include times when the plurality of posts were provided to the discussion forum and authors that provided the plurality of posts. The extracted information includes a number of authors that provided the post and one or more other posts to the discussion forum, a time when a most recent post was provided, a number of posts provided by a same author, and a number of replies to posts. The plurality of resources that have been identified by the search engine include at least one of the one or more second resources. The post included in the first resource includes an associated first time stamp, the first time stamp representing a time when the first post was provided to the discussion forum. The one or more other posts included in the one or more second resources were provided at times either before or after the time of the post included in the first resource.

In general, another aspect of the subject matter described in this specification can be embodied in methods that include the actions of receiving a request requesting a search of discussion forums and a search query; receiving information from a search engine identifying a plurality of resources that satisfy the search query; identifying a plurality of discussion thread web pages among the plurality of resources; identifying a plurality of discussion forums from the plurality of discussion thread web pages; extracting information about each of the plurality of discussion forums from the plurality of discussion thread web pages; and providing the extracted information together with a link to each of the plurality of discussion forums to a user device for display to a user as part of a response to the search query.

These and other embodiments can each optionally include one or more of the following features. Identifying the plurality of discussion forums from the plurality of discussion thread web pages includes the operations of identifying a first link to a first discussion thread web page; identifying a second link to a second discussion thread web page wherein the first link and the second link point to a same discussion forum; and determining that the first discussion thread web page includes a link pointing to the second discussion thread web page, designating the first discussion thread web page and the second thread web page as being from a same discussion forum. Each discussion thread web page includes one or more posts to a corresponding discussion forum, and the search engine has determined that at least one post included in a discussion thread web page satisfies the search query. The search engine provides a corresponding plurality of rankings to the plurality of discussion thread web pages, and the operations further include displaying a plurality of links including the link to each of the plurality of discussion forums in a descending order of the plurality of rankings, such that a link to a discussion forum that includes a discussion thread web page with a highest ranking is displayed first.

Particular implementations of the subject matter described in this specification can be implemented to realize one or more of the following advantages. The user sees an integrated view of a discussion thread that may include many relevant posts, which might otherwise be shown as scattered web pages in the results provided by the search engine. Further, the user sees multiple discussion threads that include pages with posts that are relevant to the user's search query.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Search engines crawl resources at multiple content hosts to gather information and generate a computer-searchable index of resources. Upon receiving a search query, a search engine identifies resources that the search engine determines best satisfy the search query. The search engine generates search results to present the identified resources. In some situations, a resource identified by the search engine is a discussion thread web page that includes one or more posts to a discussion thread. Discussion threads are generally maintained by a discussion forum. In some implementations, using techniques that will be described later, other discussion thread web pages related to the discussion forum topic are identified, and information about the forum is obtained and provided, for example, for display in a display device. In some implementations, the search results are filtered to identify discussion thread web pages, and information related to the discussion forum thread, or both, to which the identified discussion thread web pages belong, are provided for presentation in a display device. A discussion forum can include an individual's Internet weblog that can receive comments from weblog viewers; a threaded discussion in which messages that share a common theme, for example, subject, are grouped; a microblog in which users send brief updates that include text, audio, images, and the like, for publishing; and the like. An example process for performing these functions is described with reference to FIG. 1.

Figure 1:
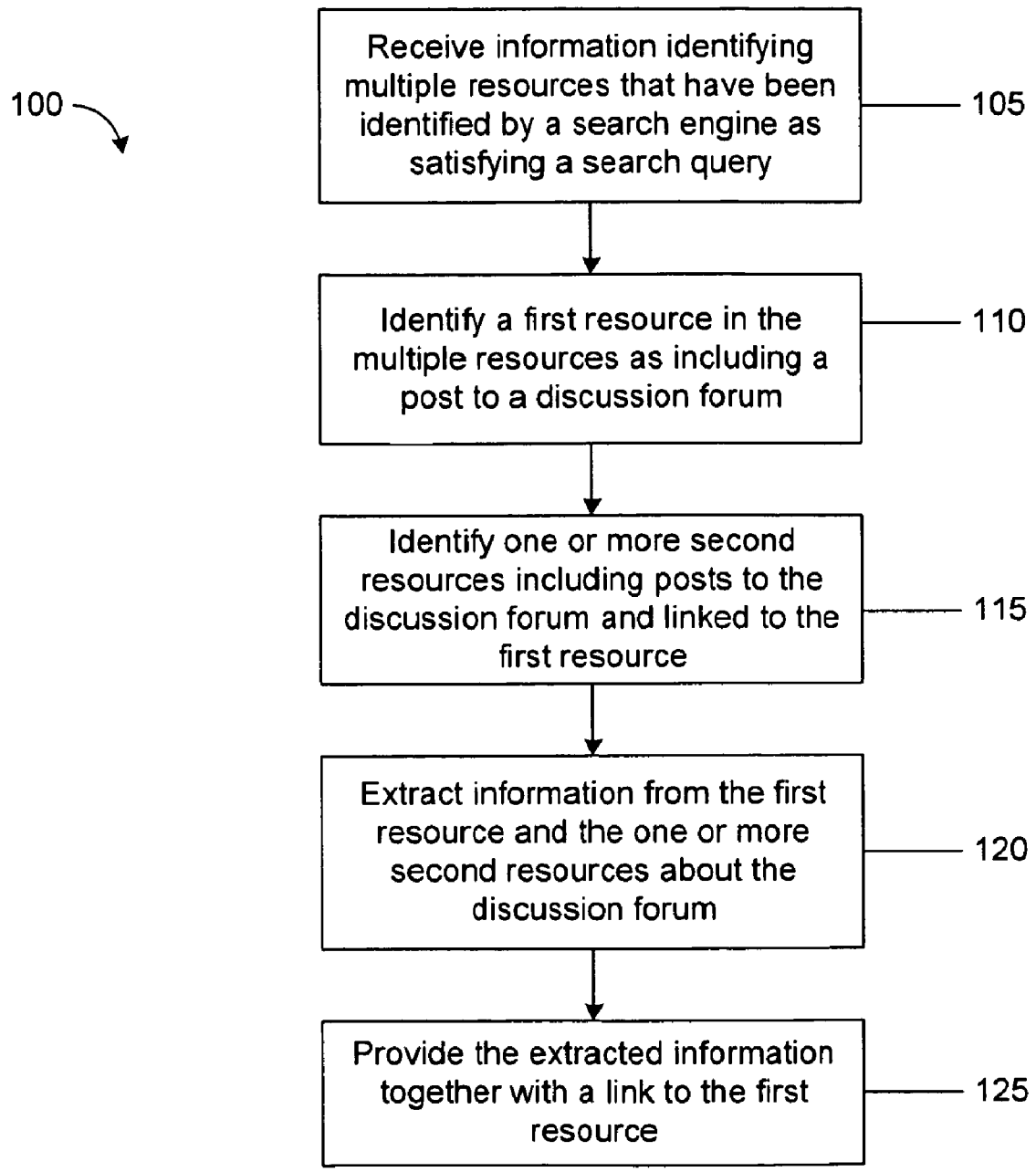
FIG. 1 illustrates an example process for extracting information about resources including posts to a discussion forum thread.

FIG. 1 illustrates an example process 100 for extracting information about Internet addressable resources that include posts to a discussion forum thread. The process 100 receives information identifying multiple resources that have been identified by a search engine as satisfying a search query (step 105). For example, the search engine, in response to a search query, has identified multiple resources that the search engine determined best satisfy the search query. The identified resources can include web pages, images, videos, and the like, stored in one or more content hosts and accessible to a search engine, against which the search engine has run its crawling and information retrieval processes. Generally, the resources are addressable by URLs (Uniform Resource Locators) on the Internet. The process 100 receives such identified resources.

The process 100 identifies a first resource in the multiple resources as including a post to a discussion forum thread (step 110). To categorize a resource, for example, a web page, as one that includes posts to a discussion forum thread, the process 100 relies on multiple criteria associated with properties of the web page and contents of the web page. In particular, certain keywords are commonly found on discussion thread web pages. Such keywords include "forum," "subject," "thread," "post," "posted by," "reply," and the like. The presence of such keywords is one criterion the process 100 uses to determine whether the web page is part of a discussion forum thread. Other criteria that can be used include whether the web page has a document structure characteristic of pages that include posts to discussion threads, the presence of a number of dates indicating a time when posts were provided, the presence of a number of user names representing authors who provided such posts, the presence of numerous links back to a forum root page, and the like.

In some implementations, to categorize a particular web page, the process 100 evaluates a polynomial in which the variables take values according to the presence or absence of a particular feature in the page—e.g., the presence of a "next" and "previous" link on the page, or the presence of the word "thread"—and the coefficients are the empirically determined weights associated with the respective features. If the value of the polynomial meets a predetermined threshold, the process 100 categorizes the page as being a page that includes one or more posts to a discussion thread. In some implementations, the features and weights are determined with the assistance of a machine-learning system.

Having determined that the first resource is a discussion thread web page, the process 100 identifies one or more additional, distinct second resources that also include posts to the discussion forum thread (step 115). Each second resource is linked directly or indirectly to the first resource, through a "next post" or "previous post" link, for example. Each of these web pages can include one or more posts depending, for example, on the implementation of the forum or the length of each post.

Upon identifying one or more second resources that are linked to the first resource so as to be part of the same thread, the process 100 extracts information from the first resource and the one or more second resources about the thread (step 120). For example, the discussion forum can receive multiple posts to a discussion thread from multiple authors. The discussion forum can associate a time stamp with each post indicating a time when an author provided the post to the discussion forum thread. The information extracted by the process 100 can include data for the number of posts in the thread, a number of authors who provided the posts, a number of posts by the same author, a time stamp of each post, an author of each post, a time stamp of the most recent post to the thread, a time stamp of the most recent post by an author, and the like.

The process 100 provides the extracted information together with a link to the first resource (step 125). For example, the process 100 can provide the extracted information to a user device for display to a user in addition to other information provided in a response to the search query. The search engine can generate snippets of information about each resource included in the search results. For example, if the identified resource is a document containing text, the snippet can include portions of the text that match text in a search query. The search engine can provide a link, for example, a URL, to each resource in the search results and provide a snippet associated with each resource for display adjacent to a link associated with the resource. The process 100 can provide the extracted information for display with the snippet and URL of the first resource. The link and the extracted information can be displayed in a user interface on a display device operatively coupled to a computer system, for example, a display device and system similar to those illustrated in FIG. 2.

Figure 2:
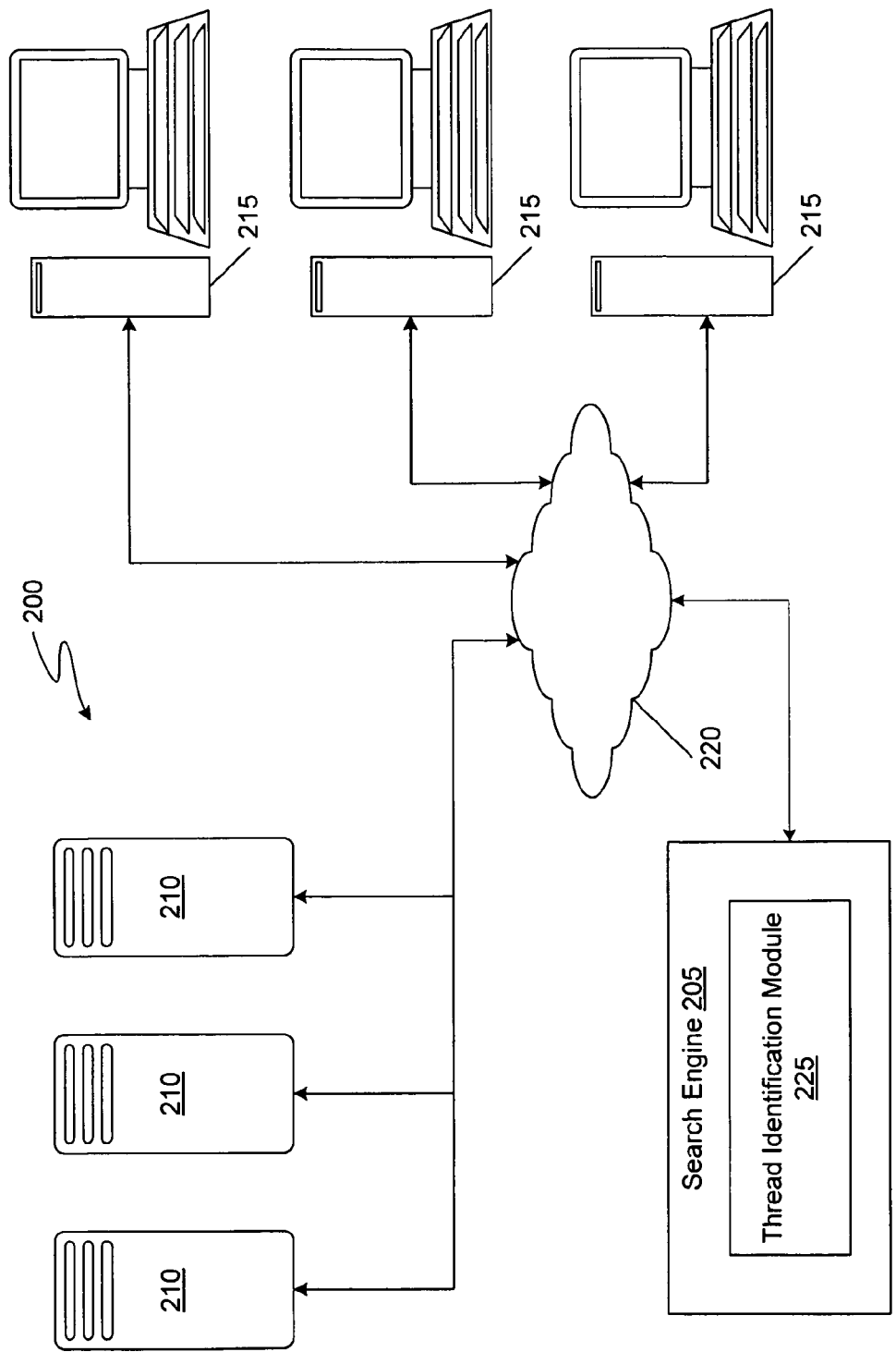
FIG. 2 illustrates an example system for identifying resources that include posts to a discussion forum thread.

FIG. 2 illustrates an example system 200 for identifying resources that include posts to a discussion forum thread. The system 200 includes a search engine 205 to identify multiple resources stored in multiple content hosts 210 in response to receiving a search query from a user device, e.g., computer system 215, operatively coupled to the search engine 205 and the content hosts 210 over one or more networks 220, for example, the Internet. Also, the system 200 includes a thread identification module 225 to identify discussion thread web pages containing posts of a discussion forum. In some implementations, the thread identification module 225 is software implemented on one or more computers and configured to perform the methods described with reference to FIG. 1 as well as methods that will be described. For example, the thread identification module 225 identifies one or more discussion thread web pages that include posts to the same discussion forum thread as a web page included in the search results, and extracts information about the thread. Subsequently, the thread identification module 225 provides the extracted information to the search engine 205 which provides both links to the resources in the search results and the extracted information to the user device from which the search query was received. The links and the extracted information can be displayed in a display, e.g., an LCD (liquid crystal display), of the user device, such that the extracted information is displayed adjacent to the link to the discussion thread web page identified by the search engine 205.

In some scenarios, more than one discussion thread web page that includes posts to the same discussion forum thread can be identified by the search engine 205 as satisfying a received search query. In such scenarios, the extracted information can be displayed adjacent to links to each discussion thread web page that is identified by the search engine 205. Alternatively, even when multiple web pages for a thread are found to satisfy the search query, only a single search results item is provided for the user with a link to the thread or a page of the thread. For example, the search engine 205 can include multiple discussion thread web pages, each of which include posts to the same discussion thread forum, in the search results that satisfy a search query. Instead of separately presenting a link to each of the identified discussion thread web pages, a link to the discussion forum thread can be presented in a single search result, with thread information, a snippet, and so on, for display to a user on a display device.

Figure 3:
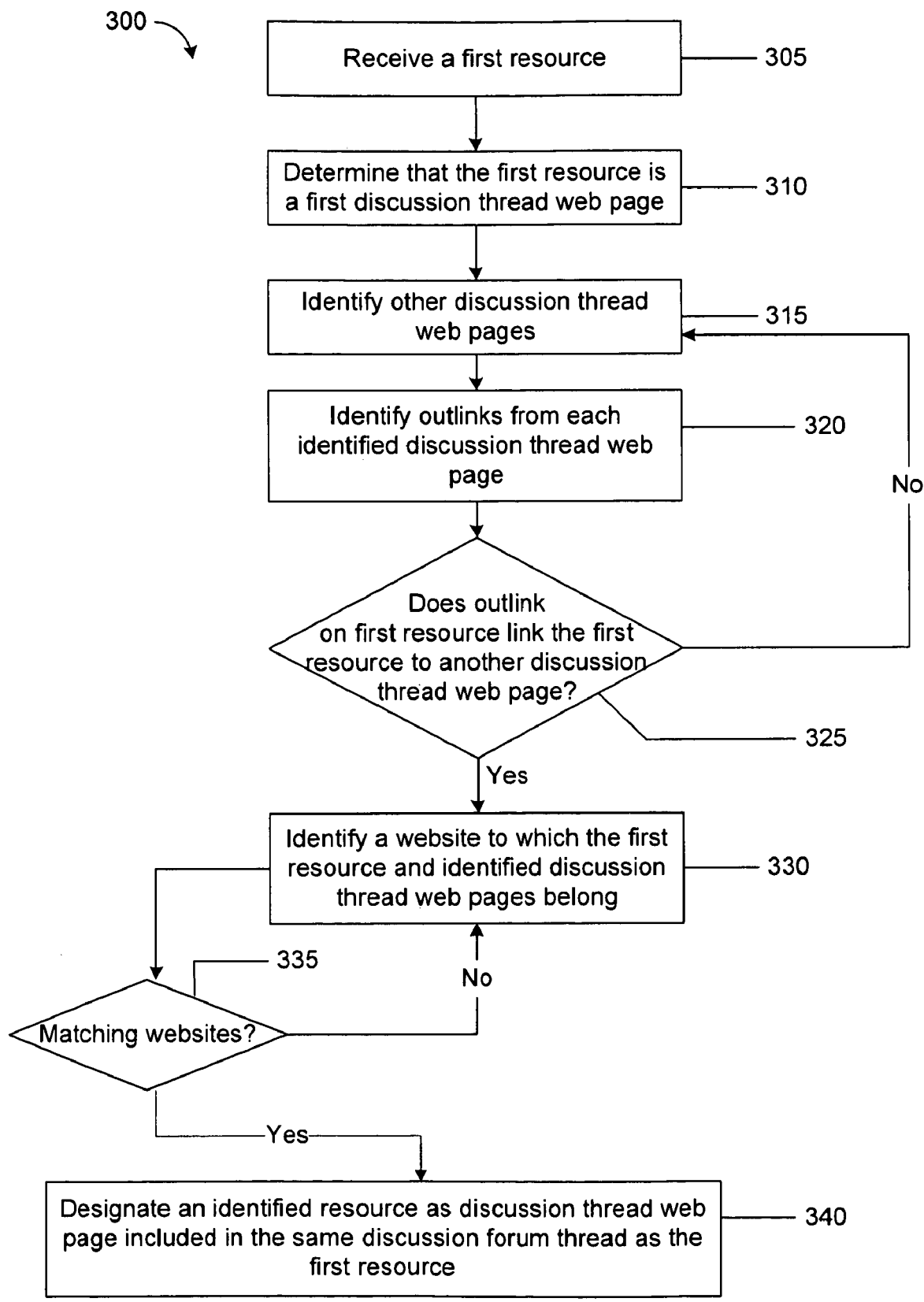
FIG. 3 illustrates an example process for determining that two resources including posts belong to the same discussion forum thread.

FIG. 3 illustrates an example process 300 for determining that two resources that include posts belong to the same discussion forum thread. Multiple resources, for example, discussion thread web pages, that include posts to a same discussion forum thread can be hyper-text markup language (HTML) documents that share certain similarities, for example, structural similarity of the document that includes the posts, common attributes to identify each discussion thread web page, and the like. Further, each discussion thread web page in a discussion forum thread includes at least one link to another discussion thread web page in the same discussion forum thread. In this manner, multiple discussion thread web pages are linked to each other.

In some implementations, the thread identification module 225 receives URLs of multiple discussion thread web pages as corresponding multiple records and stores the same, for example, as a table in a computer-readable medium. To identify discussion thread web pages that include posts to the same thread as the web page in the search results, candidate discussion thread web pages can be identified and other discussion thread web pages to which each candidate discussion thread web page contains a link can be determined. Not only should a link on a first thread web page point to a second thread web page, but also a similar link on the second thread web page should point back to the first web page. In some implementations, the candidate discussion thread web pages can be the same web pages that the search engine 205 previously crawled to create a computer-searchable index of web pages.

The process 300 receives a first resource (step 305) and determines that the first resource is a first discussion thread web page (step 310). For example, the first resource is the resource in the search results that is also identified as being a discussion thread web page. The thread identification module 225 identifies other discussion thread web pages (step 315). Some or all of the other discussion thread web pages need not be included in the search results because the search engine can have determined that posts in the other thread web pages did not satisfy the search query. Each of the identified discussion thread web pages can include URLs pointing to other resources, i.e., to resources that do not include posts to the thread.

The process 300 identifies outlinks from each identified discussion thread web page (step 320). For example, the thread identification engine 225 can identify all links on a discussion thread web page.

The process 300 checks if outlinks on the first resource directly or indirectly link the first resource to another discussion thread web page (step 325). Outlinks are links on a discussion thread web page that point to other resources, such resources including other discussion thread web pages that are included in the same discussion forum thread. A criterion by which the received records can be filtered can be outlinks on the first resource and on each of the discussion thread web pages that point to each other. Because multiple posts to a discussion forum thread span multiple pages, the pages are linked, for example, by hyperlinks represented by page numbers on each page, links represented by particular text, for example, "Next," "Previous," and the like. For example, if posts to a discussion forum thread span ten pages, then the first page can contain a hyperlink, namely, "Next" pointing to the second page in the forum or hyperlinks to multiple pages, namely, "1," "2," "3," "10," pointing to corresponding pages in the forum, and the like. Each hyperlink can include anchor text and a target URL. The thread identification module 225 determines that, if the hyperlinks on the first resource and the one or more discussion thread web pages list the same destination anchor, then the first resource and the one or more discussion thread web pages are linked directly. In addition, if a second discussion thread web page includes an outlink that points to another web page that is directly linked to the first resource, then the thread identification module 225 can conclude that the second discussion thread web page and the first resource are indirectly linked. In this manner, the thread identification module 225 can identify multiple discussion thread web pages including the web page included in the first resource that are linked to each other directly or indirectly to form threads.

Multiple discussion thread web pages that include posts to the same discussion forum thread span only a single website. The process 300 identifies a website (or, more specifically, the discussion forum) to which the first resource and identified discussion thread web pages belongs (step 330). To do so, the thread identification module 225 can examine the text in the URLs pointing to each of the identified other discussion web pages, the body of content of each web page, and the like. For example, the thread identification module 225 can examine the portion of the URL that lists the website to which a web page belongs and identify the website that includes the discussion thread web page.

The process 300 checks if the identified discussion thread web page and the first resource belong to the same website (step 335). The thread identification module 225 identifies discussion thread web pages whose links include a reference to a same website, for example, domain name, as the link to the first resource. This is another criterion by which the thread identification module 225 can determine if two discussion thread web pages are linked to the same discussion forum thread.

Upon identifying a second resource that meets the criteria described above, the process 300 designates the second resource as a discussion thread web page included in the same discussion forum thread as the first resource (step 340). If the websites are not the same, then the process repeats steps 330 and 335. Upon performing this step, the thread identification module 225 can filter the records in table to include URLs to only those discussion thread web pages that satisfy this criterion.

For example, the thread identification module 225 filters all links that do not match the criteria described above and outputs links to discussion thread web pages that do match the criteria. In some implementations, the thread identification module 225 assigns an identifier to each second resource, such that all second resources belonging to the same discussion forum thread as the first resource can be identified by the identifier. In some implementations, the thread identification module 225 stores, in nonvolatile memory, the resource identifiers (e.g., links to the resources) and thread identifiers so as to maintain a record of which resources include posts to which known threads and how the resources are linked to each other, to identify the beginning and end of each thread.

Because posts can be continuously added to a discussion forum thread, a number of discussion thread web pages across which the posts are distributed can increase with time. Periodically, the thread identification module 225 can perform steps 315, 320, 325, 330, 335, and 340 to identify if any new discussion thread web pages belong to the discussion forum thread to which the first resource belongs. Upon identifying new discussion thread web pages and upon determining that such newly identified web pages include posts to an already identified thread, the thread identification module 225 can assign an identifier to each newly identified web page according to the thread it is part of and add links to these web pages to the stored record of known threads. In this manner, all discussion thread web pages that include posts to the same discussion forum thread as the first resource are identified. When the search engine identifies a post containing resource as a resource to be provided as a search result, the thread identification module 225 can check the end of the thread in question for very recent additions so that that information can be included in the information provided to the user about the thread. In other implementations, the resources containing the entirety of a thread are identified dynamically when the search engine identifies a post-containing resource as a resource to be provided as a search result.

To extract information from the first resource and the one or more second resources about the discussion forum thread (step 120), the thread identification module 225 can scan the resources containing the thread to determine a number of authors, a number of posts in the thread, a time stamp when each post was received, and the like. Discussion forums generally collect this kind of information about a post and include it with the published post.

In some implementations, the thread identification module 225 can build a link graph where each node of the graph is an identifier of a discussion thread web page that is included in the table of records. The links in the graph represent links from one discussion thread web page in the forum to another web page. Because it is possible to access one discussion thread web page from another and vice versa, the links are bi-directional. In this manner, the thread identification module 225 can build a partitioned graph, where every partition is a discussion thread. In some implementations, each of the discussion thread web pages can be included in the computer-searchable index that the search engine 205 searches to identify search results responsive to receiving search queries. The identifier for each discussion thread web page can be stored, for example, in a unique field in a record for the page. Discussion thread web pages of the same forum can share an identifier that can enable the search engine 205 to identify records—e.g., rows in a table—of discussion thread web pages belonging to the same forum by knowing the identifier of only one of the pages in the forum.

Figure 5:
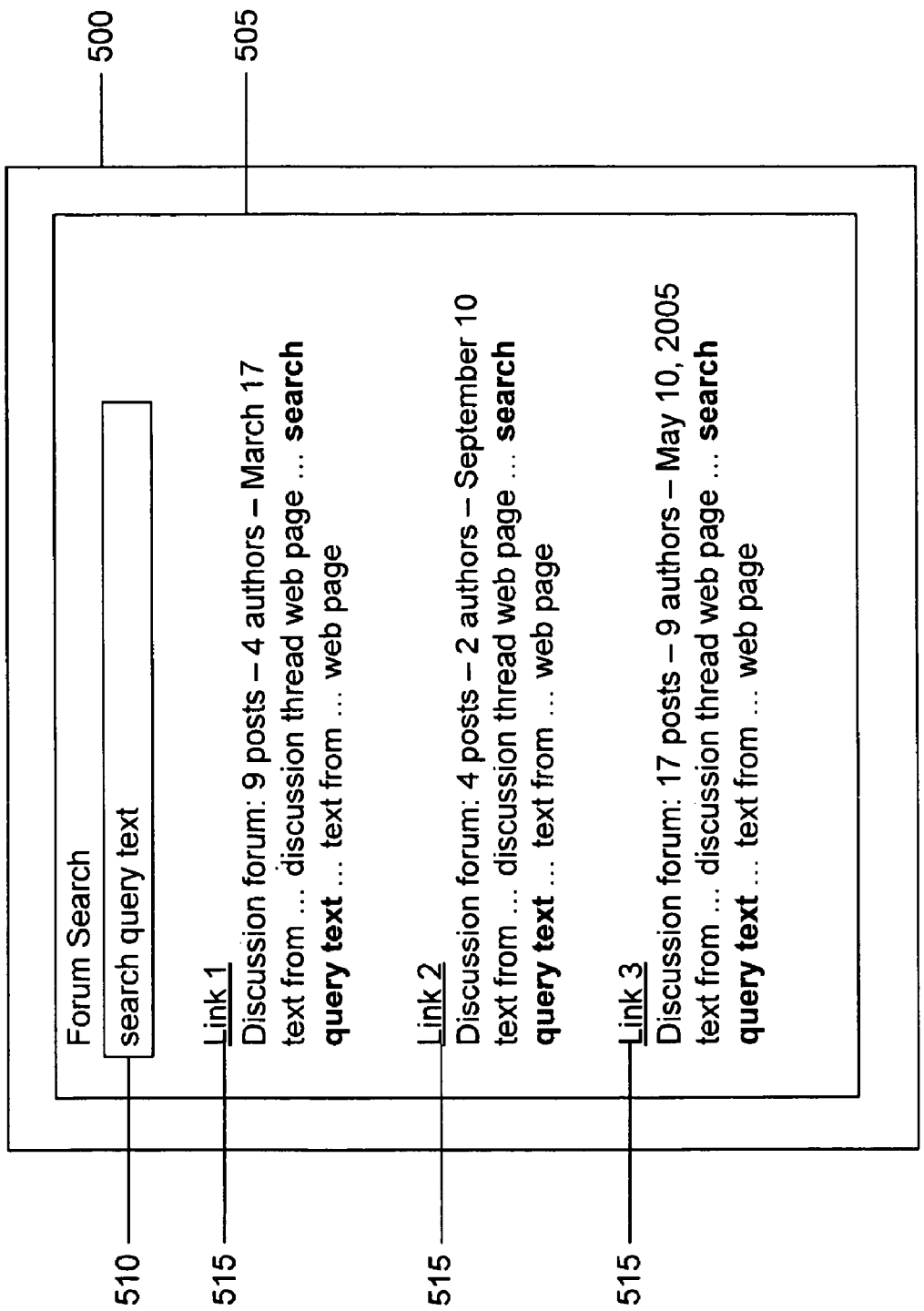
FIG. 5 illustrates an example display device in which information about discussion thread web pages of discussion forums is presented.

Having identified other discussion thread web pages that include posts to the same thread as the discussion thread web page in the search results, and having extracted information about the thread itself, the thread identification module 225 provides the extracted information to be added to the search results for display in a display device. In some implementations, the extracted information is displayed in the display device adjacent to the link to the discussion thread web page included in the search results, as illustrated in FIG. 5.

In some scenarios, the search results can include more than one discussion thread web page that includes posts to the same thread. In some scenarios, the search results can include discussion thread web pages to more than one thread. The thread identification module 225 can cluster the discussion thread web pages that include posts to each thread, and extract information about the respective threads. Further, by performing the operations described with reference to FIG. 4, the thread identification module 225 can identify discussion forums by clustering discussion thread web pages included in the search results, and present links and information related to the threads to the user in a user interface in a display device.

Figure 4:
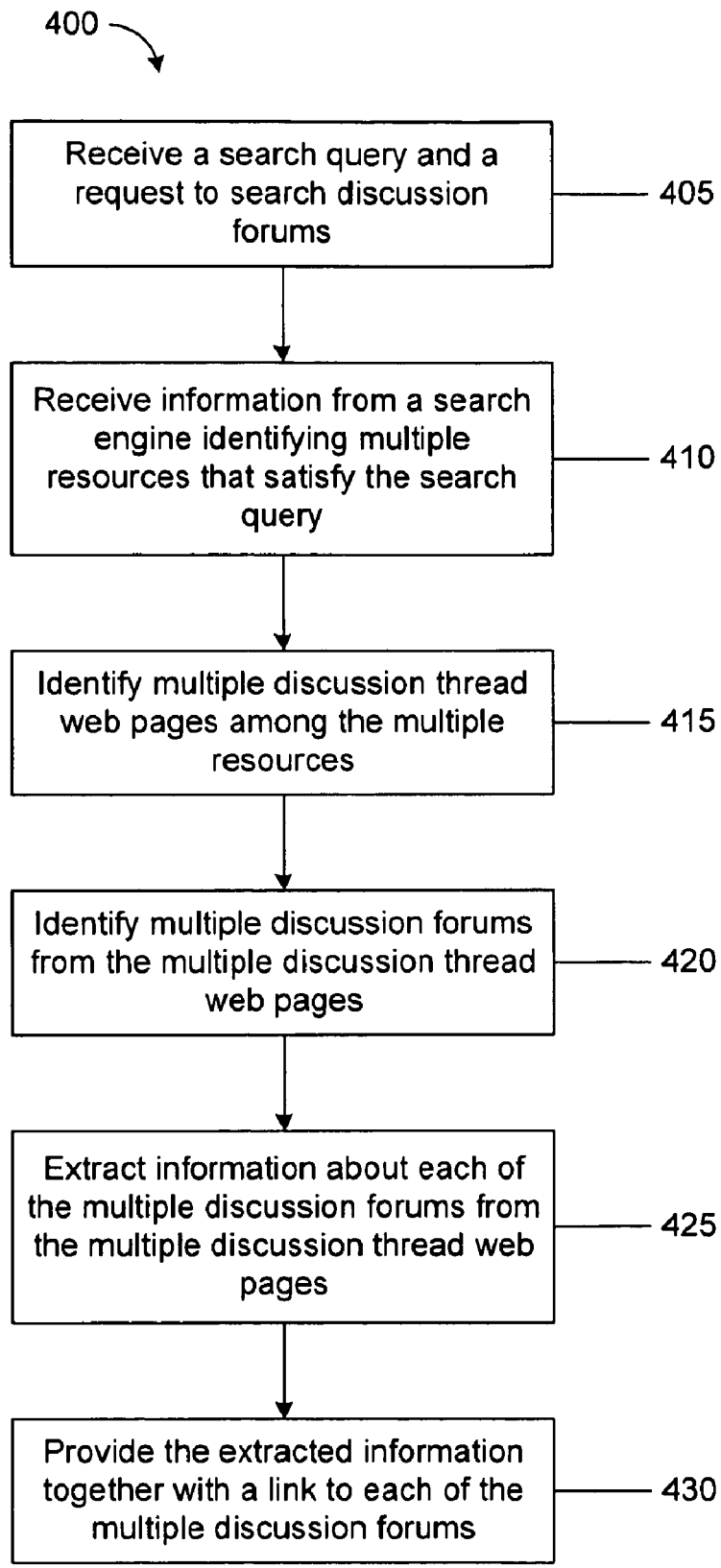
FIG. 4 illustrates an example process for providing information about resources including posts to a discussion forum thread, extracted from resources included in search results.

FIG. 4 illustrates an example process 400 for providing information in response to a search that is directed specifically to discussion forums. The process 400 receives a search query and a request to search discussion forum threads (step 405). For example, a user can present a search query in a user interface in a display device operatively coupled to a computer system 215 and a request for resources that satisfy the search query. The computer system 215 can be operatively coupled to the search engine 205 and the thread identification module 225 over one or more networks, for example, the Internet.

The process 400 receives information from a search engine 205 identifying multiple resources that satisfy the search query (step 410).

The process 400 identifies multiple discussion thread web pages among the multiple resources (step 415). For example, using methods described previously, the thread identification module 225 identifies multiple discussion thread web pages from among the multiple resources. The identified discussion thread web pages represent a combination of web pages including posts to a same discussion forum thread and web pages including posts to different discussion forum threads.

The process 400 extracts information about each of the multiple discussion forum threads from the multiple discussion thread web pages (step 420). For example, the thread identification module 225 can identify multiple thread web pages including posts to the same discussion forum thread as described previously. Further, the thread identification module 225 can perform the previously described operations over the multiple discussion thread web pages to group the web pages by discussion forum threads. Subsequent to the grouping, the thread identification module 225 can extract information about each discussion forum using the methods described above.

The process 400 provides the extracted information together with a link to each of the multiple discussion forum threads (step 430). As described previously, the search results received from the search engine 205 include multiple discussion thread web pages that include posts to multiple discussion forum threads. The search results presented in a display device include links to the multiple discussion thread web pages and snippets associated with the multiple discussion thread web pages. In some implementations, the extracted information about the respective thread is displayed adjacent to the link to a thread web page that is in thread, as shown in FIG. 5.

FIG. 5 illustrates an example display device 500 in which information about discussion thread web pages of discussion forum threads is presented. The display device 500 can be a component in a computer system 215 that is operatively coupled to the search engine 205 and the thread identification module 225 over one or more networks 220. A user interface 505 displayed in the display device 500, for example, by a web browser, can include a text box 510 into which a user can enter a search query. In response, the links to resources identified by the search engine 205 can be displayed in the user interface 505, for example, below the text box 510. In the example of FIG. 5, the search results 515 are limited to discussion thread web pages. In other implementations, such results 515 can be included with other results, for example, news results or general web search results. Links, namely, Link 1, Link 2, and Link 3, pointing to the discussion thread web pages identified by the search engine 205 are displayed in the user interface 505. Beneath each link, information about the discussion forum is displayed. For example, FIG. 5 shows that the discussion thread web page to which Link 1 points is a discussion forum including nine posts by four authors, the latest of which was received on March 17. The time of day can also be displayed if available. When a user selects Link 1, for example, the web browser opens the discussion thread web page to which Link 1 points. Using outlinks located on the discussion thread web page, the user can navigate to other posts in the thread.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a portable storage device (e.g., a universal serial bus (USB) flash drive), to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. The search engine associates rankings with resources in the search results, each ranking representing a relevance of a resource to the search query. Consequently, discussion thread web pages included in search results have an associated ranking. When the search results displayed in the user interface are limited to discussion thread web pages, the links to the discussion thread web pages can be displayed in a descending order based on a decreasing ranking of the discussion thread web pages.

What is claimed is:

1. A system comprising:
   one or more computers; and
   a computer-readable medium tangibly encoding a computer program operable when executed to cause the one or more computers to perform operations comprising:
      receiving information identifying a plurality of resources that have been identified by a search engine as satisfying a search query;
      determining that a first resource in the plurality of resources includes a post to a discussion forum;
      identifying one or more second resources that are each distinct from the first resource, that are each linked directly or indirectly to the first resource, and that each include one or more other posts to the discussion forum, and wherein the second resources include at least one resource that is not in the plurality of resources;
      extracting information about the discussion forum from the first resource and the one or more second resources including the at least one resource that is not in the plurality of resources; and
      providing the extracted information about the discussion forum together with a link to the first resource to a user device for display to a user as part of a response to the search query.

2. The system of claim 1, wherein the one or more second resources are identified based at least in part on one or more attributes that the first resource and each second resource share, the operations to identify the one or more second resources further comprising:
   determining a value of an attribute for the first resource;
   identifying other resources with which the attribute is associated;
   determining the value of the attribute of the other resources; and
   designating an identified resource as a second resource if the value of the attribute of the identified resource equals the value of the attribute of the first resource.

3. The system of claim 2, wherein the one or more attributes include times when the plurality of posts were provided to the discussion forum and authors that provided the plurality of posts.

4. The system of claim 3, wherein the extracted information includes a number of authors that provided the post and one or more other posts to the discussion forum, a time when a most recent post was provided, a number of posts provided by a same author, and a number of replies to posts.

5. The system of claim 3, wherein the plurality of resources that have been identified by the search engine include at least one of the one or more second resources.

6. The system of claim 1, wherein the post included in the first resource includes an associated first time stamp, the first time stamp representing a time when the first post was provided to the discussion forum.

7. The system of claim 6, wherein the one or more other posts included in the one or more second resources were provided at times either before or after the time of the post included in the first resource.

8. A computer-implemented method comprising:
receiving information identifying a plurality of resources that have been identified by a search engine as satisfying a search query;
  determining that a first resource in the plurality of resources includes a post to a discussion forum;
  identifying one or more second resources that are each distinct from the first resource, that are each linked directly or indirectly to the first resource, each second resource including and that each include one or more other posts to the discussion forum, and wherein the second resources include at least one resource that is not in the plurality of resources;
  extracting information about the discussion forum from the first resource and the one or more second resources the at least one resource that is not in the plurality of resources; and
  providing the extracted information about the discussion forum together with a link to the first resource to a user device for display to a user as part of a response to the search query.

9. The method of claim 8, wherein the one or more second resources are identified based at least in part on one or more attributes that the first resource and each second resource share, the method further comprising:
  determining a value of an attribute for the first resource;
  identifying other resources with which the attribute is associated;
  determining the value of the attribute of the other resources; and
  designating an identified resource as a second resource if the value of the attribute of the identified resource equals the value of the attribute of the first resource.

10. The method of claim 9, wherein the one or more attributes include times when the plurality of posts were provided to the discussion forum and authors that provided the plurality of posts.

11. The method of claim 10, wherein the extracted information includes a number of authors that provided the post and one or more other posts to the discussion forum, a time when a most recent post was provided, a number of posts provided by a same author, and a number of replies to posts.

12. The method of claim 10, wherein the plurality of resources that have been identified by the search engine include at least one of the one or more second resources.

13. The method of claim 8, wherein the post included in the first resource includes an associated first time stamp, the first time stamp representing a time when the first post was provided to the discussion forum.

14. The method of claim 13, wherein the one or more other posts included in the one or more second resources were provided at times either before or after the time of the post included in the first resource.

15. A system comprising:
one or more computers; and
a computer-readable medium tangible encoding a computer program that is operable when executed to cause the one or more computers to perform operations comprising:
  receiving a request requesting a search of discussion forums and a search query;
  receiving information from a search engine identifying a plurality of resources that each satisfy the search query;
  identifying a plurality of discussion thread web pages among the plurality of resources that each satisfy the search query, wherein each discussion thread web page is in a particular discussion forum;
  grouping the discussion thread web pages into a plurality of discussion forums;
  extracting information about each of the plurality of discussion forums from the discussion thread web pages in the respective discussion forum; and
  providing the respective extracted information together with a link to each of the plurality of discussion forums to a user device for display to a user as part of a response to the search query.

16. The system of claim 15, wherein identifying the plurality of discussion forums from the plurality of discussion thread web pages comprises:
  identifying a first link to a first discussion thread web page;
  identifying a second link to a second discussion thread web page wherein the first link and the second link point to a same discussion forum; and
  determining that the first discussion thread web page includes a link pointing to the second discussion thread web page, designating the first discussion thread web page and the second thread web page as being from a same discussion forum.

17. The system of claim 15, wherein each discussion thread web page includes one or more posts to a corresponding discussion forum, and wherein the search engine has determined that at least one post included in a discussion thread web page satisfies the search query.

18. The system of claim 15, wherein the search engine provides a corresponding plurality of rankings to the plurality of discussion thread web pages, the operations further comprising:
  displaying a plurality of links including the link to each of the plurality of discussion forums in a descending order of the plurality of rankings, such that a link to a discussion forum that includes a discussion thread web page with a highest ranking is displayed first.

19. A computer-implemented method comprising:
  receiving a request requesting a search of discussion forums and a search query;
  receiving information from a search engine identifying a plurality of resources that each satisfy the search query;
  identifying a plurality of discussion thread web pages among the plurality of resources that each satisfy the search query, wherein each discussion thread web page is in a particular discussion forum;
  grouping the discussion thread web pages into a plurality of discussion forums;
  extracting information about each of the plurality of discussion forums from the discussion thread web pages in the respective discussion forum; and
  providing the respective extracted information together with a link to each of the plurality of discussion forums to a user device for display to a user as part of a response to the search query.

20. The method of claim 19, wherein identifying the plurality of discussion forums from the plurality of discussion thread web pages comprises:
  identifying a first link to a first discussion thread web page;
  identifying a second link to a second discussion thread web page wherein the first link and the second link point to a same discussion forum; and
  determining that the first discussion thread web page includes a link pointing to the second discussion thread web page, designating the first discussion thread web page and the second thread web page as being from a same discussion forum.

21. The method of claim 19, wherein each discussion thread web page includes one or more posts to a corresponding discussion forum, and wherein the search engine has determined that at least one post included in a discussion thread web page satisfies the search query.

22. The method of claim 19, wherein the search engine provides a corresponding plurality of rankings to the plurality of discussion thread web pages, the operations further comprising:

displaying a plurality of links including the link to each of the plurality of discussion forums in a descending order of the plurality of rankings, such that a link to a discussion forum that includes a discussion thread web page with a highest ranking is displayed first.

23. A computer storage medium encoded with a computer program comprising instructions that when executed by data processing apparatus cause the data processing apparatus to perform operations comprising:

receiving information identifying a plurality of resources that have been identified by a search engine as satisfying a search query;

determining that a first resource in the plurality of resources includes a post to a discussion forum;

identifying one or more second resources that are each distinct from the first resource, that are each linked directly or indirectly to the first resource, and that each include one or more other posts to the discussion forum, and wherein the second resources include at least one resource that is not in the plurality of resources;

extracting information about the discussion forum from the first resource and the one or more second resources including the at least one resource that is not in the plurality of resources; and providing the extracted information about the discussion forum together with a link to the first resource to a user device for display to a user as part of a response to the search query.

24. A computer storage medium encoded with a computer program comprising instructions that when executed by data processing apparatus cause the data processing apparatus to perform operations comprising:

receiving a request requesting a search of discussion forums and a search query;

receiving information from a search engine identifying a plurality of resources that each satisfy the search query;

identifying a plurality of discussion thread web pages among the plurality of resources that each satisfy the search query, wherein each discussion thread web page is in a particular discussion forum;

grouping the discussion thread web pages into a plurality of discussion forums;

extracting information about each of the plurality of discussion forums from the discussion thread web pages in the respective discussion forum; and providing the respective extracted information together with a link to each of the plurality of discussion forums to a user device for display to a user as part of a response to the search query.

25. The system of claim 1, wherein each second resource linked directly or indirectly to the first resource is linked by one or more outlinks beginning in the first resource and ending in the second resource.

26. The method of claim 8, wherein each second resource linked directly or indirectly to the first resource is linked by one or more outlinks beginning in the first resource and ending in the second resource.

27. The storage medium of claim 23, wherein each second resource linked directly or indirectly to the first resource is linked by one or more outlinks beginning in the first resource and ending in the second resource.

* * * * *

UNITED STATES PATENT AND TRADEMARK OFFICE
CERTIFICATE OF CORRECTION

| | | |
|---|---|---|
| PATENT NO. | : 8,402,021 B2 | Page 1 of 1 |
| APPLICATION NO. | : 12/533959 | |
| DATED | : March 19, 2013 | |
| INVENTOR(S) | : Tomislav Nad and Jonathan Wilson | |

It is certified that error appears in the above-identified patent and that said Letters Patent is hereby corrected as shown below:

In the Claims

Column 13, Line 9-10, Claim 8, after "resource", delete "each second resource including".

Column 13, Line 16, Claim 8, after "resources", insert -- including --.

Signed and Sealed this
Thirtieth Day of September, 2014

Michelle K. Lee
*Deputy Director of the United States Patent and Trademark Office*